(12) United States Patent
Ito et al.

(10) Patent No.: US 9,874,069 B2
(45) Date of Patent: Jan. 23, 2018

(54) SEAL ASSEMBLY

(71) Applicant: Schlumberger Technology Corporation, Sugar Land, TX (US)

(72) Inventors: Masaei Ito, Sagamihara (JP); Hitoshi Sugiyama, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/157,412

(22) Filed: May 18, 2016

(65) Prior Publication Data

US 2016/0348461 A1    Dec. 1, 2016

Related U.S. Application Data

(60) Provisional application No. 62/166,675, filed on May 26, 2015.

(51) Int. Cl.
| | | |
|---|---|---|
| *E21B 33/03* | (2006.01) | |
| *F16J 15/46* | (2006.01) | |
| *E21B 33/12* | (2006.01) | |
| *F16J 15/02* | (2006.01) | |
| *F16J 15/16* | (2006.01) | |

(52) U.S. Cl.
CPC ......... *E21B 33/1208* (2013.01); *F16J 15/022* (2013.01); *F16J 15/166* (2013.01)

(58) Field of Classification Search
CPC .... F16J 15/022; F16J 15/166; E21B 33/1208; E21B 33/1216
See application file for complete search history.

(56) References Cited

U.S. PATENT DOCUMENTS

| | | | | |
|---|---|---|---|---|
| 5,165,703 A | * | 11/1992 | Morvant | ............. E21B 33/1208 277/342 |
| 6,290,231 B1 | * | 9/2001 | Petrash | ................... E21B 33/03 277/324 |
| 7,373,973 B2 | * | 5/2008 | Smith | ................. E21B 33/1216 166/134 |
| 7,919,554 B2 | | 4/2011 | Noguchi et al. | |
| 2006/0157283 A1 | | 7/2006 | Hart | |
| 2011/0061857 A1 | * | 3/2011 | White | ................. E21B 33/1216 166/196 |
| 2011/0156357 A1 | | 6/2011 | Noguchi et al. | |

* cited by examiner

*Primary Examiner* — Gilbert Y Lee
(74) *Attorney, Agent, or Firm* — Trevor G. Grove

(57) ABSTRACT

A seal assembly and an apparatus including the same are provided. The seal assembly may include a seal member with axially opposing sides and one or two back-up rings for substantially supporting at least one side of the seal member. The seal member may be made of elastomer and have an axially extending base with one or two flange portions and a protrusion extending perpendicularly from the base. The back-up ring may be made of a plastic material and a portion of the back-up ring may abut a radially outer surface of the flange portion of the seal member.

20 Claims, 7 Drawing Sheets

SEAL ASSEMBLY

RELATED APPLICATIONS

This application claims the benefit of a related U.S. Provisional Application Ser. No. 62/166,675, filed May 26, 2015, entitled "SEAL ASSEMBLY," to Masaei I T O et al., the disclosure of which is incorporated by reference herein in its entirety.

BACKGROUND

This disclosure relates generally to seal assemblies for high pressure application and, more particularly, to dynamic seal assemblies that are suitable for applications relating to various types of downhole in oilfield or gasfield.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In high pressure environments such as a downhole well of an oilfield or gasfield, various types of seal assemblies have been developed to used in order to provide adequate dynamic sealing in such challenging conditions. One example of the type of the seal assemblies is formed as a T-seal, a seal member having a T-shaped cross section and a pair of back-up rings, such as those described in U.S. Pat. No. 6,302,405, which is incorporated herein by reference in its entirety. Another example is an L-seal that is a seal member having L-shaped cross section, and may be used as a seal member instead of the T-seal.

The T-seal or L-seal have a generally rectangular base and a central protrusion extending perpendicularly from the approximate center of the base. These seals are placed between a first component and a second component between which a seal is desired to be maintained. The bottom of the base of the seal member abuts the first component and the top of the protrusion of the seal member abuts the second component to provide the desired seal. The back-up rings abut each side of the T-seal and the tops of the back-up rings also abut to the second component in order to provide support for the T-seal.

As will become apparent from the following description and discussion, the present disclosure provides improved seal assemblies formed of a seal member and at least one back-up ring, which are capable of reducing damage such as the wearing and cracking of the back-up ring in high pressure applications.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a seal assembly comprises a seal member with axially opposing sides and one or two back-up rings for substantially supporting at least one side of the seal member. The seal member is made of elastomer and has an axially extending base with one or two flange portions and a protrusion extending perpendicularly from the base.

The back-up ring is made of plastic material and a portion of the back-up ring abutting a radially outer surface of the flange portion of the seal member. A ratio L1/L0 of an axial length L1 of the portion of the back-up ring to an axial total length L0 of the back-up ring is defined so as to satisfy a formula of $\sigma max < \sigma b$, where the $\sigma max$ is a maximum stress generated on a top surface of the back-up ring under a condition in which a desired maximum pressure Pmax is applied to the seal assembly at a desired maximum temperature Tmax. And $\sigma b$ is a braking compressive stress of material of the back-up ring at the temperature T max.

In another aspect of the present disclosure, an apparatus used in an oilfield or a gasfield comprises a first component, a second component that is movable relatively to the first component, and a seal assembly for sealing between the first component and the second component. The seal assembly comprises a seal member with axially opposing sides and one or two back-up rings for substantially supporting at least one side of the seal member. The seal member is made of elastomer and has an axially extending base with one or two flange portions and a protrusion extending perpendicularly from the base.

The back-up ring is made of plastic material and a portion of the back-up ring abutting a radially outer surface of the flange portion of the seal member. A ratio L1/L0 of an axial length L1 of the portion of the back-up ring to an axial total length L0 of the back-up ring is defined so as to satisfy a formula of $\sigma max < \sigma b$, where the $\sigma max$ is a maximum stress generated on a top surface of the back-up ring under a condition in which a desired maximum pressure Pmax is applied to the seal assembly at a desired maximum temperature Tmax. And $\sigma b$ is a braking compressive stress of material of the back-up ring at the temperature T max.

Advantages and novel features of the disclosures will be set forth in the description which follows or may be learned by those skilled in the art through reading the materials herein.

BRIEF DESCRIPTION OF THE DRAWINGS

Embodiments of seal assemblies and apparatuses having the same according to the disclosures herein are described with reference to the following figures. The same reference numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Figure 1:
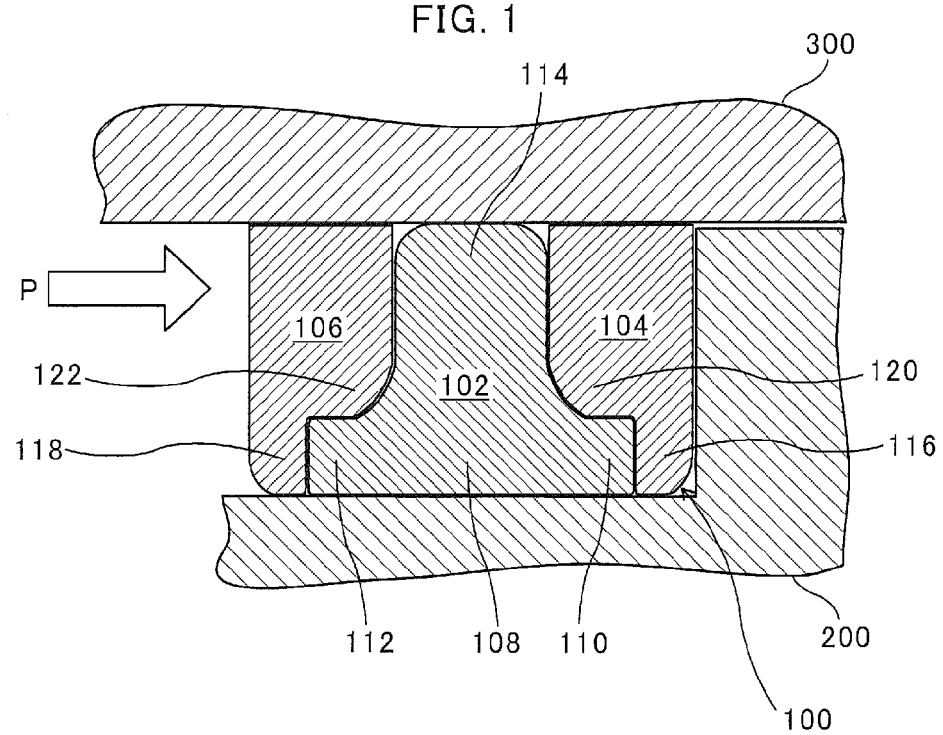
FIG. 1 is a cross-sectional view schematically illustrating a dynamic seal assembly according to one embodiment of the disclosures herein.

Referring now to FIG. 1, a dynamic seal assembly 100 suitable for the application of a wide pressure range between about 100 [psi] and 45,000 [psi], according to one embodiment of the disclosures herein, is formed as a T-seal 102. T-seal 102 is a seal member with axially opposing sides and a pair of back-up rings 104, 106 for supporting substantially both sides of the T-seal 102. The T-seal 102 has an axially extending base 108 with two flange portions 110, 112 and a protrusion 114 extending perpendicularly from the base 108. The T-seal 102 also has T-shaped cross-section defined by the base 108 and the protrusion 114. A portion of each back-up ring 104, 106 abuts each of radially outer surfaces of the flange portion 110, 112 of the T-seal 102. The T-seal 102 may be made of an elastomer described elsewhere herein and the back-up rings 104, 106 may be made of a plastic material.

The plastic material may be a chemical compound having at least one of polyetheretherketone (PEEK), polyetherketone (PEK), polyaryletherketone (PAEK), polyphenylsulfone (PPSU), polyphenylene sulfide (PPS), high-temperature sulfone (HTS), self-reinforced plastic (SRP), polyamide-imide (PAI) and polyimide (PI). The plastic material also may be a composite having the foregoing chemical compound as a matrix. High strength plastic material such as PEEK having a relatively high strength compared to soft plastic material such as PTFE (polytetraflouroethylene) may be used for the back-up rings 104, 106 to stably support the T-seal 102 in high pressure applications without additional members such as bearings abutting the side of back-up rings 104, 106.

The dynamic seal assembly 100, according to an embodiment of the disclosures herein, is applicable to any application requiring seals wherein two components need to be sealed. For example, the dynamic seal assembly 100 may be used in the place of other seals. However, one area in which the seal provides service, not attainable by presently available commercial seals, is in applications of high temperature (above 150[° C.]) and high pressure (above 10,000 [psi]), especially when the components to be sealed are reciprocating or moving relative to one another.

To facilitate the description of the dynamic seal assembly 100, the dynamic seal assembly 100 is described herein as exemplarily applied to a rod piston 200 of a subsurface safety valve. The description of the dynamic seal assembly 100 in conjunction with this specific tool is for ease of description and understanding only. Embodiments of the seal may have various applications to many other tools, components, and environments. Thus, in the following discussion, the dynamic seal assembly 100 is described as sealing around the piston 200 as a first component and a bore 300 as a second component housing the piston 200. The piston 200 is movable relatively to the bore 300. The bottom surface of the T-seal 102 abuts the piston 200 and the top surface of the T-seal 102 abuts the bore 300 to complete the seal.

The rod piston 200 hydraulically may control a subsurface safety valve in the example application. Pressure P is supplied to the rod piston 200 from the surface in order to move the piston 200 to actuate the valve into open and closed positions. The seal assembly 100 isolates the pressure within the valve from the control pressure acting on the piston 200 by sealing between the piston 200 and the bore 300. The actuating pressure and the environment of the well in which the safety valve is positioned can create a high temperature and high pressure environment for the seal assembly 100.

The elastomer used for the T-seal 102 may be a chemical compound having at least one of fluoro-elastomer (FKM), tetrafluoro-ethylene-propylene elastomer (FEPM), perfluoro-elastomer (FFKM), hydrogenated nitrile elastomer (HNBR), nitrile elastomer (NBR), copolymer of isobutylene and isoprene (IIR) and ethylene propylene-diene elastomer (EPDM) although other elastomers and materials may also be suitable depending upon the application. The elastomer may be a composite having the foregoing chemical compound as a matrix. For example, the T-seal 102 may includes a ternary fluoroelastomer (FKM) and carbon nanofibers as described in U.S. Patent Application Publication 2011/0156357 and U.S. Pat. No. 7,919,554, which are hereby incorporated herein by reference in their entirety.

The back-up rings 104, 106 extend the full height of the T-seal 102 and substantially abut the full sides of the T-seal 102, lending lateral support to the T-seal 102. In the present embodiment shown in FIG. 1, the cross-sectional shape of back-up rings 104, 106 is an inverted-L. The inverted-L shape has a first portion 116, 118 extending radially from the piston 200 to the bore 300 and abutting the side of the flange portion 110, 112 of the T-seal 102. In addition, the inverted-L shape has a second portion 120, 122, extending axially from the first portion 116, 118 toward the protrusion 114 and substantially filling the area between the flange portion 110, 112, the protrusion 114 and the first portion 110, 112. Therefore, the inner diameter of the back-up ring 104, 106 rests on flange portion 110, 112 of the T-seal 102 and on the piston 200. Thus, the inverted-L shape is capable of substantially supporting the full side of the T-seal 102.

Note that possible alternative embodiments including the existence of voids in the back-up rings 104, 106, which provide non-abutting portions between the top and bottom of the T-seal 102 and back-up rings 104, 106, are considered within the disclosures herein. In addition, the term "substantially the full side of the T-seal 102" specifically includes such alternatives. Further, the components of the back-up rings 104, 106 and the T-seal 102 may undergo expansion due to thermal variations.

Therefore, the back-up rings 104, 106 may include gaps or may have a height that is less than the full height of the T-seal 102 at certain temperatures and may not technically support the complete side of the T-seal 102 at all temperatures. These design characteristics may be required to achieve the desired performance at a target service pressure and temperature range or for other reasons. However, such designs and variations are considered part of the disclosures herein and within the scope of the disclosures herein and the term "substantially the full side of the T-seal 1 2" specifically includes such alternatives.

In the previous design of a general dynamic seal assembly with elastomer T-seal and plastic back-up rings for high pressure applications, the bottom surfaces of back-up rings 104, 106 abut the top surfaces of flange portion 100, 112 of the T-seal 102 by a relatively large area and relatively large applied pressure. In this design, if high pressure (i.e. 15,000-45,000 [psi]) is applied to the seal assembly, the T-seal is squeezed and hydrostatic pressure is generated in the T-seal by the applied pressure because poison ratio of elastomer is nearly 0.5. Since the hydrostatic pressure of T-seal, which is nearly equal to the applied pressure P, is transferred to the back-up ring 104, 106 as a relatively large normal force to the bore 300, a top surface of the back-up ring 104, 106 tends to be easily damaged when moving along an inner circumferential surface of the bore 300. In addition, the lifetime of the back-up ring tends to be shortened due to damage such as the wearing and cracking generated at the top of the back-up ring.

To address the issues associated with the damage such as the wearing and cracking of the back-up rings in high pressure applications, in one embodiment of the disclosures herein, a ratio L1/L0 of an axial length L1 of the second portion 120, 122 to an axial total length L0 of each back-up ring 104, 106 is defined so as to satisfy a formula of $\sigma_{max} < \sigma_b$. The $\sigma_{max}$ is a maximum stress generated on the top surface of each back-up ring 104, 106 under a condition that a maximum desired pressure Pmax is applied to the seal assembly 100 at a maximum desired temperature Tmax.

As described above, since the hydrostatic pressure of the T-seal is nearly equal to the applied pressure P and transferred to the back-up rings as a relatively large normal force to the bore 300, the maximum stress $\sigma_{max}$ generated on the top surface of the back-up rings may be generally determined based on the desired maximum pressure Pmax and the ratio L1/L0 of the back-up ring. For example, the maximum stress $\sigma_{max}$ may be determined using a formula of $P_{max} \times (L1/L0)$. The $\sigma_b$ is a breaking compressive stress of the material of the back-up rings 104, 106 at the maximum temperature T max (e.g. 175-200[° C.]). Although the breaking compressive stress $\sigma_b$ may be about 2,100 to 28,000 [psi] for a plastic material such as PEEK, PEK, PAEK, PPSU, PPS, HTS, SRP, PAI, PI and it's composite at room temperature, the breaking compressive stress $\sigma_b$ may be measured for the material of the back-up rings 104, 106 at the maximum temperature T max (e.g. 175-200[° C.]) under a reciprocating load condition.

The formula of $\sigma_{max} < \sigma_b$ may be modified by considering a safety factor S for the breaking compressive stress $\sigma_b$. For example, the foregoing ratio L1/L0 may be defined so as to satisfy a formula of $\sigma_{max} < \sigma_b/S$ instead of the foregoing $\sigma_{max} < \sigma_b$. The value of safety factor S may be 10 to 20 for a plastic material such as PEEK, PEK, PAEK, PPSU, PPS, HTS, SRP, PAI, PI and it's composite.

In one embodiment of the disclosures herein, the ratio L1/L0 of the back-up rings 104, 106 may be set in the range of about 1/10 to 9/10 so that the back-up rings 104, 106 are capable of supporting the T-seal 102 certainly and stably, while reducing damage such as the wearing and cracking of the back-up rings 104, 106 in high pressure applications. For example, the ratio L1/L0 may be about 1/2 to attain improvements in both stably supporting the T-seal 102 and reducing damage to the back-up rings 104, 106.

Figure 2:
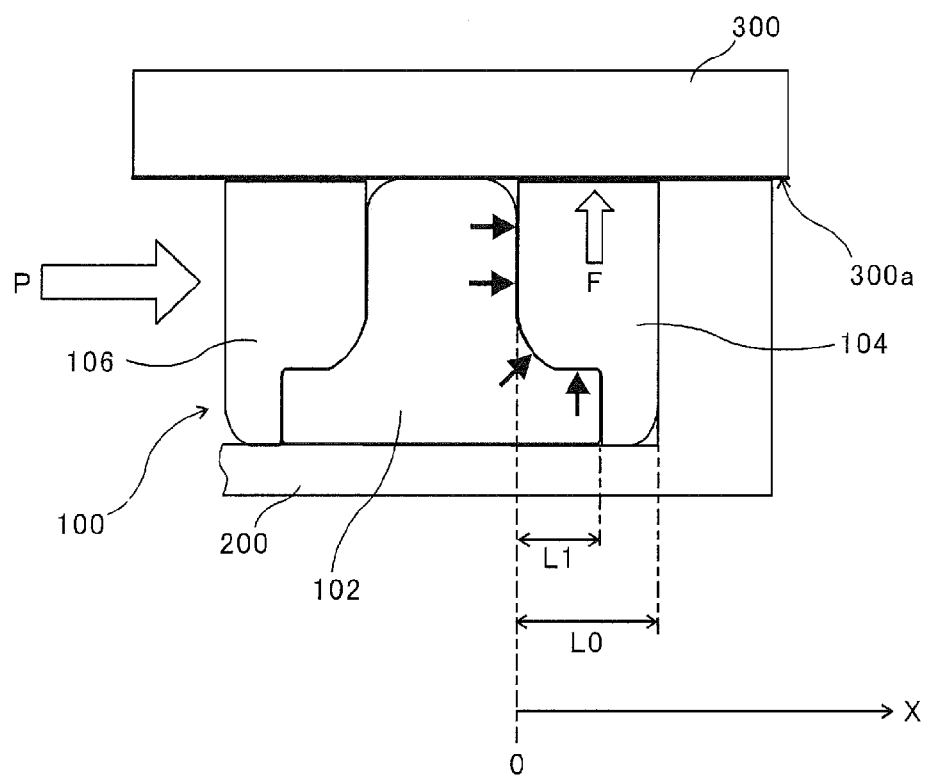
FIG. 2 is a schematic view of a dynamic seal assembly used for computer simulation of stress generated on a back-up ring of the disclosures herein.
Figure 3:
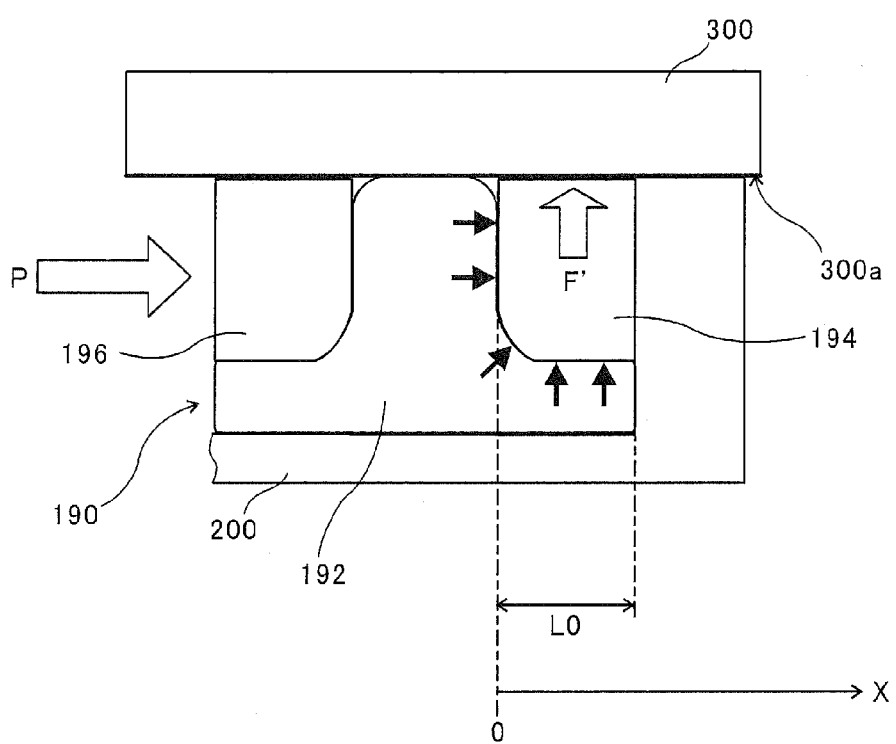
FIG. 3 is a schematic view of a seal assembly in a comparative example.
Figure 4:
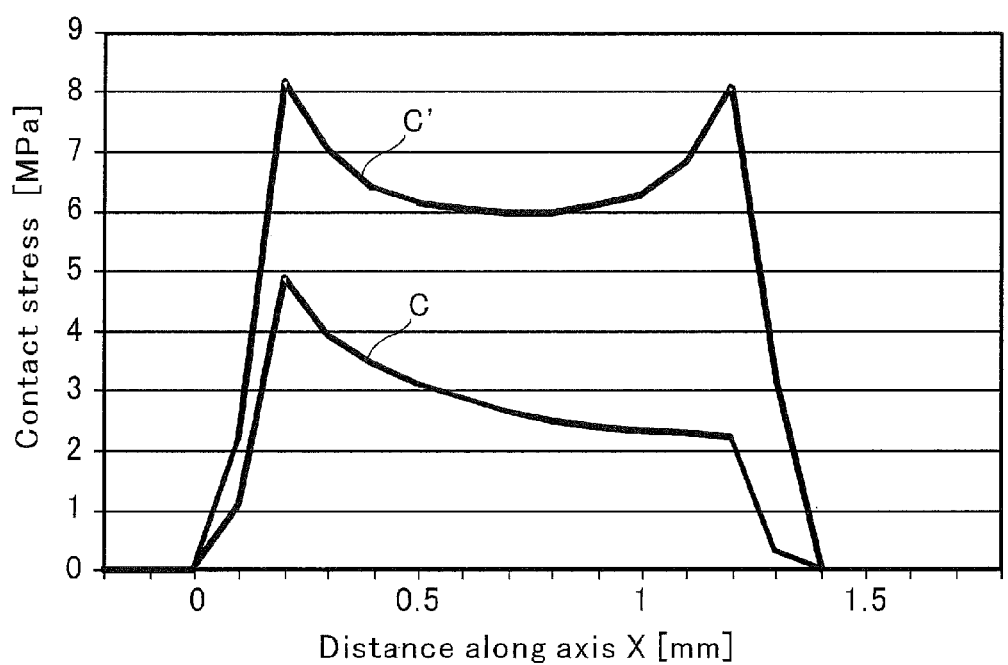
FIG. 4 is a graph showing a computer simulation result of the dynamic seal assembly of the disclosures herein.

Features of the seal assembly 100 by defining the ratio L1/L0 of the axial length L1 of the second portion 120, 122 to the axial total length L0 of the back-up rings 104, 106, according to one embodiment of the disclosures herein, are also described below with reference to computer simulation results in FIGS. 2 to 4. FIG. 2 is a schematic view of a dynamic seal assembly 100 used for computer simulation of the stresses generated on embodiments of a back-up ring according to the disclosures herein. FIG. 3 is a schematic view of a seal assembly in a comparative example. FIG. 4 is a graph showing a computer simulation result of the dynamic seal assembly 100 of the disclosures herein.

As illustrated in FIG. 2, the ratio L1/L0 is set to about 1/2 to reduce the normal force (F) directing from the back-up ring 104 to the inner circumferential surface 300a of the bore 300 by about half of the hydrostatic pressure P generated in the T-seal 102. Alternatively, in the comparative example of sealing assembly 190, the cross sectional shape of back-up rings 194, 196 is a nearly square and the back-up rings extends radially from the piston 200 to the inner circumferential surface 300a of the bore 300. The back-up rings 194, 196 abuts the top of the flange portion of T-seal 192 and has no portion abutting side of the flange portion of T-seal 192. The dynamic seal assembly 190 in this comparative example is considered to be a case of the ratio L1/L0 being equal to zero (L1=0). Almost all of the hydrostatic pressure P generated in the T-seal 192 is transferred to the normal force (F') directing from the back-up ring 194 to the inner circumferential surface 300a of the bore 300.

FIG. 4 shows a graph of computer simulation results of the longitudinal contact stress generated on the top surfaces of the back-up rings 104, 194 in FIGS. 2 and 3. The applied pressure P is 1000 [psi] (6.9 [MPa]). The abscissa of the graph is the distance along axis X in FIGS. 2 and 3, and the ordinate represents the longitudinal stress generated on top surfaces of the back-up rings 104, 194. The curves C and C' represent the spatial distribution of longitudinal contact stress [MPa] on top surfaces of the back-up rings 104, 194 along the axis X, respectively.

According to the results of computer simulation results, the dynamic seal assembly 100 of an embodiment of the disclosure herein is capable of reducing the stress generated on the top surfaces of the back-up rings 104 down to almost half of the stress seen in the dynamic seal assembly 190 of the comparative example. The reduction rate of the longitudinal stress on the top surface of the back-up ring 104 can be adjusted by changing the ratio L1/L0 of the axial length L1 of the second portion 120 to the axial total length L0 of the back-up ring 104.

By defining the ratio L1/L0 so as to satisfy the formula of $\sigma_{max} < \sigma_b$ (or $\sigma_{max} < \sigma_b/S$), the dynamic seal assembly 100 is capable of reducing damage such as wearing and cracking of the back-up ring 104, 106 in high pressure applications as well as providing a long lifetime for the dynamic seal assembly 100. Furthermore, even if a high strength plastic material such as PEEK is used for the back-up ring 104, 106, damage of the back-up rings 104, 106 can be reduced in high pressure applications by up to about 45,000 [psi] by adjusting the ratio L1/L0 so as to satisfy the formula of $\sigma_{max} < \sigma_b$.

In one embodiment of the disclosure herein, an axially outer bottom edge of the back-up rings 104, 106 is round-shaped, as shown in FIGS. 1 and 2, so as to reduce damage such as cracking due to stress concentration of the back-up rings 104, 106. Furthermore, a corner between the base 108 and the protrusion 114 of the T-seal 102 may also be round-shaped, and an axially inner side surface of the back-up rings 104, 106 may be shaped so as to be along the corner of the T-seal 102, so that damage such as cracking due to stress concentration of the back-up rings 104, 106 and the T-seal 102 can be reduced.

Figure 5:
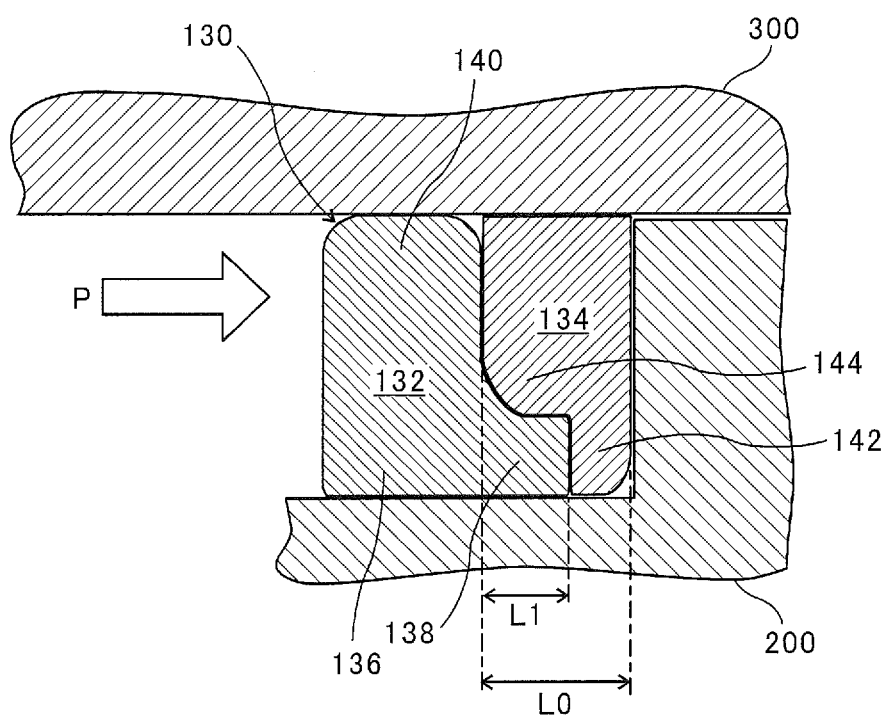
FIG. 5 is a cross-sectional view schematically illustrating a dynamic seal assembly according to one embodiment of the disclosures herein.

FIG. 5 is a cross-sectional view schematically illustrating a dynamic seal assembly 130 according to an embodiment of the disclosure herein. The dynamic seal assembly 130 in this embodiment is suitable for use in an apparatus with high pressure applied in only one direction. The dynamic seal assembly 130 includes an L-seal 132 as a seal member and a back-up ring 134 for substantially supporting one side of the L-seal 132.

The L-seal 132 has an axially extending base 136 with one flange portion 138 and a protrusion 140 extending perpendicularly from the base 136. The L-seal 132 has an L-shaped cross-section defined by the base 136 and the protrusion 140. A portion of the back-up ring 134 abuts a radially outer surface of the flange portion 138 of the L-seal 132. The L-seal 132 may be made of an elastomer such as a perfluoroelastomer (FFKM), flouroe-lastomer (FKM), etc., and the back-up ring 134 may be made of a plastic material.

The back-up ring 134 may extend the full height of the L-seal 132 and abut substantially to one side of the L-seal 132 in order to lend lateral support to the L-seal 132. In the present embodiment shown in FIG. 5, the cross-sectional shape of the back-up ring 134 is an inverted-L. The inverted-L shape has a first portion 142 extending radially from the piston 200 to the bore 300 and abutting the side of the flange portion 138 of the L-seal 132, and a second portion 144 extending axially from the first portion 142 toward the protrusion 140 and substantially filling the area between the flange portion 138, the protrusion 140 and the first portion 142. Therefore, the inner diameter of the back-up ring 134 rests on flange portion 138 of the L-seal 132 and on the piston 200. As a result, the inverted-L shape is capable of substantially supporting the side of the L-seal 132.

The dynamic seal assembly 130 according to an embodiment of the disclosure herein and shown in FIG. 5, has a ratio L1/L0 of an axial length L1 of the second portion 144 to an axial total length L0 of the back-up ring 134 and is defined so as to satisfy a formula of σmax<σb. One function of the dynamic seal assembly 130 is to address the above-mentioned issues identified with damage such as wearing and cracking of the back-up ring in high pressure applications. The σmax is the maximum stress generated on the top surface of the back-up ring 134 under the conditions when a maximum desired pressure Pmax is applied to the seal assembly 100 at a maximum desired temperature Tmax. The σb is the breaking compressive stress of material of the back-up ring 134 at the maximum temperature T max (e.g. 175-200[° C.]).

The dynamic seal assemblies of the disclosure herein may be used for an apparatus such as a downhole tool as described in U.S. Patent Application Publication 2011/0156357 and U.S. Pat. No. 7,919,554, a well head, and the like. For example, the dynamic seal assemblies may be used for a logging tool, a rotating machine (e.g., motor), a reciprocating machine (e.g., piston), or the like. Typical embodiments of oilfield apparatus are described below.

A downhole logging tool records the physical properties of a formation, a reservoir, and the like inside and around a borehole, geometrical properties (e.g., pore size, orientation, and slope) of a borehole or a casing, the flow behavior of a reservoir, and the like, at various depths. For example, a logging tool may be used in an oilfield or gasfield. In addition, a logging tool may also be used for subsea applications shown in FIG. 6 or in underground applications shown in FIG. 7.

A logging tool may be classified as a wireline log/logging tool, a mud logging tool, a logging-while-drilling (LWD) tool, a measurement-while-drilling (MWD) tool (i.e., a measuring instrument is provided in a drilling assembly), and the like. Since these logging tools are used in deep underground locations, a dynamic seal assembly used therein may be subjected to a relatively severe environment. It may be necessary for the seal assembly to endure friction at a high pressure (particularly up to 15,000 [psi]-45,000 [psi]) and still maintain liquid-tightness. Therefore, dynamic seal assemblies may be required to exhibit high pressure resistance without incurring damage to their elements such as back-up rings of the seal assembly.

Figure 6:
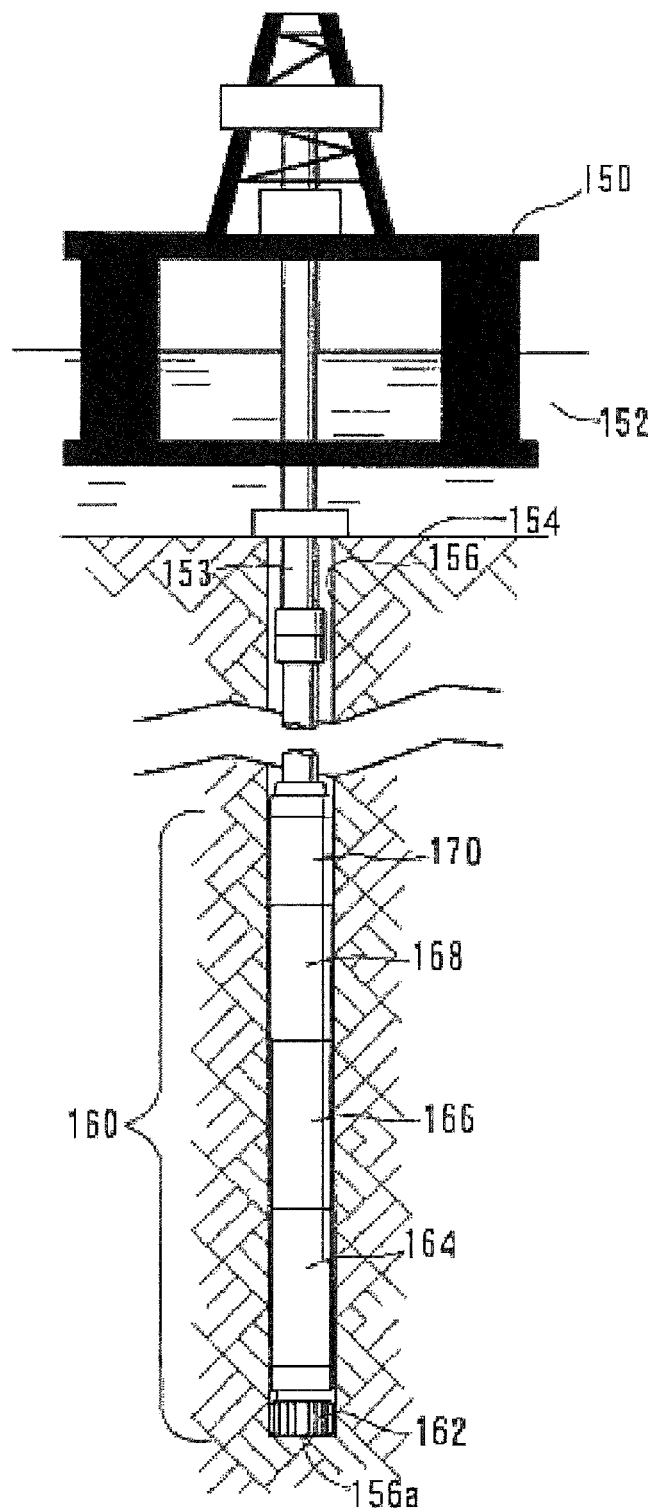
FIG. 6 is a cross-sectional view schematically illustrating a logging tool used for subsea applications according to one embodiment of the disclosures herein.
Figure 7:
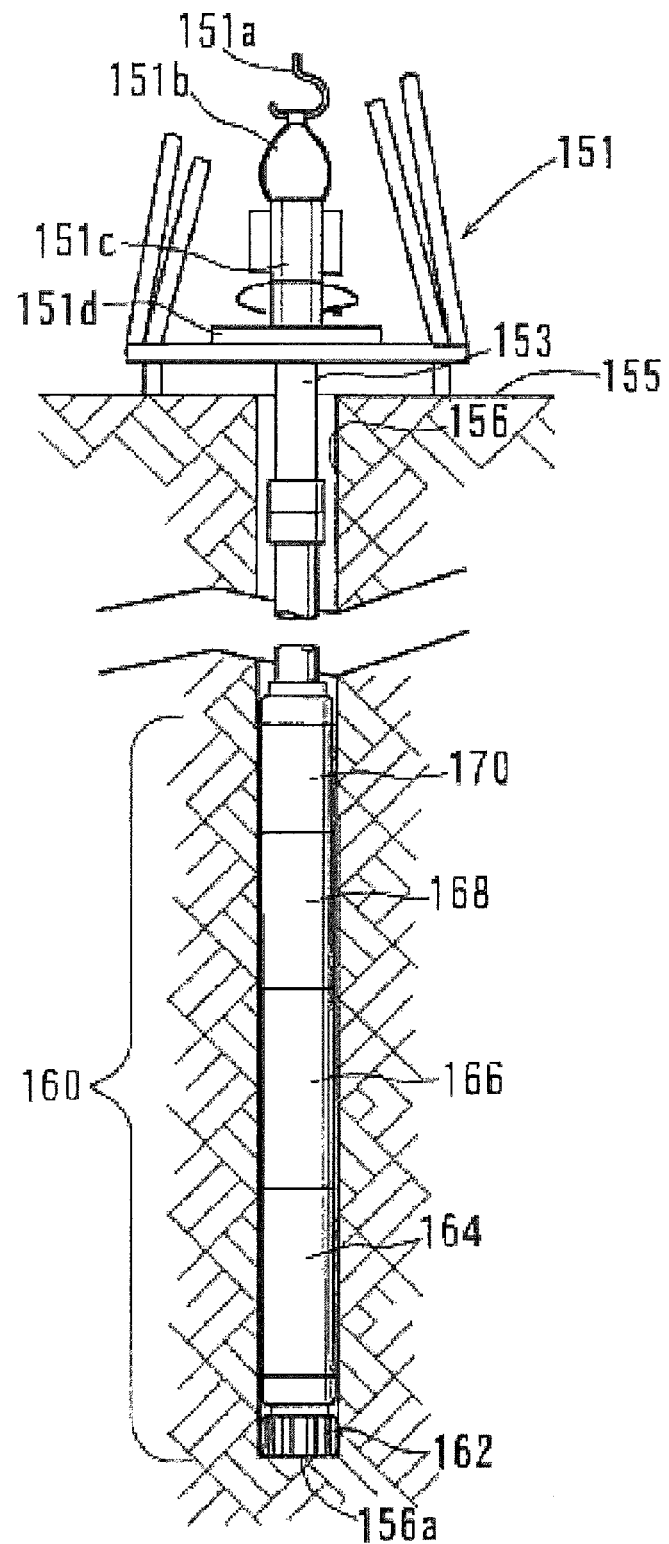
FIG. 7 is a cross-sectional view schematically illustrating a logging tool used for underground applications according to one embodiment of the disclosures herein.

A dynamic seal assembly according to one of the embodiments of the disclosure herein that may be used for a logging tool is described below with reference to FIGS. 6 and 7. FIG. 6 is a cross-sectional view schematically illustrating a logging tool used in a subsea application, for example. FIG. 7 is a cross-sectional view schematically illustrating a logging tool used for underground applications in accordance with embodiments of the disclosure herein.

As illustrated in FIG. 6, when probing undersea resources using a measuring instrument provided in a drilling assembly, a bottom hole assembly (BHA) 160 (i.e., logging tool) is advanced in a borehole 156 (e.g., a vertical or horizontal passageway) formed in an ocean floor 154 from a platform 150 on the sea 152. The underground structure and the like are investigated to determine the presence or absence of any target substances (e.g., petroleum), for example.

The bottom hole assembly 160 may be secured on the end of a long drill string 153 that extends from the platform 150, and includes a plurality of modules. For example, the bottom hole assembly 160 may include a drill bit 162, a rotary steerable system (RSS) 164, a mud motor 166, a measurement-while-drilling module 168, and a logging-while-drilling module 170, that are connected from the end of the bottom hole assembly 160. The drill bit 162 is rotated (i.e., drills) at a bottom hole 156a of the borehole 156.

The rotary steerable system 164 may include a deviation mechanism that causes the drill bit 162 to deviate in a given direction in a desired orientation as the drill bit 162 rotates, thereby facilitating directional drilling. The dynamic seal assembly according to an embodiment of the disclosure herein may be applied to the rotary steerable system 164. The rotary steerable system 164 requires a dynamic seal assembly that is able to exhibit a high pressure resistance up to about 15,000 [psi]-45,000 [psi], or a dynamic seal assembly that is able to exhibit a high chemical resistance against mud, for example.

A related-art dynamic seal assembly may not properly function due to wear and tear of component elements such as back-up rings of the seal assembly. This problem may be even more serious in a severe chemical environment. In addition, the dynamic seal assembly for a rotary steerable system disclosed in US-A-2006/0157283 is required to function at a high sliding speed (100 mm/sec or less). However, the above problems mentioned with regards to related-art dynamic seal assemblies may be exacerbated by reduced properties of the back-up ring at the usage pressure of the drilling fluid.

Conversely, when using a dynamic seal assembly according to an embodiment of the disclosure herein as the dynamic seal assembly of the rotary steerable system 164, the above problems can be properly addressed through high pressure resistance for sealing drilling mud, which may contain particles, better chemical resistance against exposure to a wide range of drilling fluids, and better mechanical properties at a high pressure that reduces tearing in addition to the above properties of the dynamic seal assembly.

A mud motor 166 may also be referred to as a downhole motor. The mud motor 166 is a fluid-driven motor that is driven by the flow of mud and rotates the drill bit 162.

Examples of the mud motor 166 include a mud motor for deviated wellbore drilling applications. The dynamic seal assembly according to an embodiment of the disclosure herein may be applied to the mud motor 166.

A mud motor 166 requires a dynamic seal assembly that is able to exhibit high pressure resistance at 15,000 to 45,000 [psi] and high-temperature properties at about 175 to 200[° C.], a dynamic seal assembly that can function under extreme abrasive conditions, or a dynamic seal assembly that exhibits chemical resistance to handle a wide range of drilling muds, for example. When using a dynamic seal assembly according to an embodiment of the disclosure herein as the dynamic seal assembly of the mud motor 166, the above problems can be addressed through better mechanical properties at a high pressure and high temperatures. Embodiments of the current disclosure may reduce tearing and chunking, offer better chemical resistance against exposure to a wide range of drilling fluids, result in a reduction in local heat spots due to better thermal conductivity, and the like, in addition to previously discussed properties of the dynamic seal assembly.

A measurement-while-drilling (MWD) module 168 may include a measurement-while-drilling instrument that is disposed inside a chamber provided on a wall of a pipe (i.e., drill collar) that has a relatively thick wall. A MWD instrument may include various sensors. For example, the MWD instrument may measure bottom hole data (e.g., orientation, slope, bit direction, load, torque, temperature, and pressure), and transmit the measured data to the ground in real time.

A logging-while-drilling (LWD) module 170 may include a LWD instrument that is disposed inside a chamber provided on a wall of a pipe (i.e., drill collar) that has a relatively thick wall. Like the MWD, the LWD instrument may include various sensors. For example, the LWD instrument may measure specific resistivity, porosity, acoustic wave velocity, gamma-rays, and the like to obtain physical logging data, and transmit the physical logging data to the ground in real time.

As illustrated in FIG. 7, when probing underground resources from ground 155 using a measuring instrument provided in a drilling assembly, various elements are often present. In some cases, a platform and a derrick assembly 151 that are disposed over a borehole 156, and a bottom hole assembly (BHA) 160 (i.e., logging tool) that is disposed in a borehole 156 (vertical or horizontal passageway) formed under the derrick assembly 151 are used, for example. The derrick assembly 151 may include a hook 151a, a rotary swivel 151b, a kelly 151c, and a rotary table 151d.

The bottom hole assembly 160 may be secured on the end of a long drill string 153 that extends from the derrick assembly 151, for example. Mud may be supplied to the drill string 153 from a pump through the rotary swivel 151b to drive a fluid-driven motor of the bottom hole assembly 160. The bottom hole assembly 160 may be basically the same as that of the logging tool for subsea applications described with reference to FIG. 7. Accordingly, in the interest of brevity, a description thereof is omitted.

A dynamic seal assembly according to an embodiment of the disclosures herein may also be employed for the logging tool for underground applications. The above embodiment has been described while using an example in which the bottom hole assembly 160 includes the drill bit 162, the rotary steerable system 164, the mud motor 166, the MWD module 168, and the LWD module 170. Note that the elements may be appropriately selected and combined depending on the particular logging application.

An oilfield or gasfield application is not limited to applications involving a logging tool. For example, the dynamic seal assembly according to one embodiment of the disclosures herein may be used for a downhole tractor used for wireline log/logging. Examples of the downhole tractor include "MaxTRAC" or "TuffTRAC" (trademark; manufactured by Schlumberger Limited). A downhole tractor may require a reciprocating dynamic seal assembly having high abrasion resistance for longer operational life and reliability at about 175 to 200[° C.], or less under high pressure environment at about 15,000-45,000 [psi] or less.

A dynamic seal assembly according to an embodiment of the disclosure herein may also be applied to a formation testing and reservoir fluid sampling tool, for example. Examples of the formation testing and reservoir fluid sampling tool include "Modular Formation Dynamics Tester (MDT)" (trademark; manufactured by Schlumberger Limited). Other applications include an in-situ fluid sampling bottle and an in-situ fluid analysis and sampling bottle, for example. Such a bottle may be used for a formation testing/reservoir fluid sampling tool or a wireline log/logging tool, for example. In addition, dynamic seal assemblies according to an embodiment of the disclosure herein may also be applied to an in-situ fluid analysis tool (IFA), for example.

In some cases, a dynamic seal assembly according to an embodiment of the disclosure herein may also be applied to all tools used for wireline log/logging, LWD, well testing, perforation, and sampling operations, for example. Further, a dynamic seal assembly according to an embodiment of the disclosure herein may also be applied to a side wall coring tool, for example. Additional examples include, but are not limited to telemetry and power generation tools in drilling applications, or applications for inflating a packer that is used for isolating part of a wellbore for sampling and formation testing.

A dynamic seal assembly according to an embodiment of the disclosure herein may also be applied to an apparatus such as a well head, which may be disposed over a wellbore and used in the platform in FIGS. 6 and 7, for example.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A seal assembly, comprising:
   a seal member with axially opposing sides, the seal member being made of elastomer, the seal member having an axially extending solid base with one or two flange portions and a protrusion extending perpendicularly from the base; and
   one or two back-up rings for supporting substantially at least one side of the seal member, the back-up ring being made of plastic material, a portion of the back-up ring abutting a radially outer surface of the flange portion of the seal member,
   wherein a ratio $L1/L0$ of an axial length $L1$ of the portion of the back-up ring to an axial total length $L0$ of the back-up ring is defined so as to satisfy a formula of $\sigma$max<$\sigma$b, where the $\sigma$max is a maximum stress generated on a top surface of the back-up ring under a condition that a desired maximum pressure Pmax is applied to the seal member through the back-up rings at a desired maximum temperature Tmax and the $\sigma$b is a braking compressive stress of material of the back-up ring at the temperature T max.

2. The seal assembly according to claim 1, wherein the seal member is a T-seal having T-shaped cross-section defined by the base and the protrusion.

3. The seal assembly according to claim 1, wherein the seal member is an L-seal having L-shaped cross-section defined by the base and the protrusion.

4. The seal assembly according to claim 1, wherein the ratio L1/L0 is set in the range of about 1/10 to 9/10.

5. The seal assembly according to claim 1, wherein the desired maximum pressure Pmax is in the range of about 100 [psi] to 45,000 [psi].

6. The seal assembly according to claim 1, wherein an axially outer bottom edge of the back-up ring is round-shaped.

7. The seal assembly according to claim 1, wherein a corner between the base and the protrusion of the seal member is round-shaped, and an axially inner side surface of the back-up ring is shaped so as to be along the corner of the seal member.

8. The seal assembly according to claim 1, wherein the plastic material comprises a chemical compound having at least one of polyetheretherketone (PEEK), polyetherketone (PEK), polyaryletherketone (PAEK), polyphenylsulfone (PPSU), polyphenylene sulfide (PPS), high-temperature sulfone (HTS), self-reinforced plastic (SRP), polyamide-imide (PAI) and polyimide (PI), or a composite having the chemical compound as a matrix.

9. The seal assembly according to claim 1, wherein the elastomer comprises a chemical compound having at least one of fluoro-elastomer (FKM), tetrafluoro-ethylene-propylene elastomer (FEPM), perfluoro-elastomer (FFKM), hydrogenated nitrile elastomer (HNBR), nitrile elastomer (NBR), copolymer of isobutylene and isoprene (IIR) and ethylene propylene-diene elastomer (EPDM), or a composite having the chemical compound as a matrix.

10. The seal assembly according to claim 9, wherein the elastomer comprises a ternary fluoro-elastomer (FKM) and carbon nanofibers.

11. An apparatus used in oilfield or gasfield, comprising:
a first component;
a second component that is movable relatively to the first component; and
a seal assembly for sealing between the first component and the second component,
wherein the seal assembly comprises:
a seal member with axially opposing sides, the seal member being made of elastomer, the seal member having an axially extending solid base with one or two flange portions and a protrusion extending perpendicularly from the base; and
one or two back-up rings for supporting substantially at least one side of the seal member, the back-up ring being made of plastic material, a portion of the back-up ring abutting a radially outer surface of the flange portion of the seal member, and
wherein a ratio L1/L0 of an axial length L1 of the portion of the back-up ring to an axial total length L0 of the back-up ring is defined so as to satisfy a formula of $\sigma$max<$\sigma$b, where the $\sigma$max is a maximum stress generated on a top surface of the back-up ring under a condition that a desired maximum pressure Pmax is applied to the seal member through the back-up rings at a desired maximum temperature Tmax and the $\sigma$b is a braking compressive stress of material of the back-up ring at the temperature T max.

12. The apparatus according to claim 11, wherein the seal member is a T-seal having T-shaped cross-section defined by the base and the protrusion.

13. The apparatus according to claim 11, wherein the seal member is an L-seal having L-shaped cross-section defined by the base and the protrusion.

14. The apparatus according to claim 11, wherein the ratio L1/L0 is set in the range of about 1/10 to 9/10.

15. The apparatus according to claim 11, wherein the desired maximum pressure Pmax is in the range of about 100 [psi] to 45,000 [psi].

16. The apparatus according to claim 11, wherein an axially outer bottom edge of the back-up ring is round-shaped.

17. The apparatus according to claim 11, wherein a corner between the base and the protrusion of the seal member is round-shaped, and an axially inner side surface of the back-up ring is shaped so as to be along the corner of the seal member.

18. The apparatus according to claim 11, wherein the plastic material comprises a chemical compound having at least one of polyetheretherketone (PEEK), polyetherketone (PEK), polyaryletherketone (PAEK), polyphenylsulfone (PPSU), polyphenylene sulfide (PPS), high-temperature sulfone (HTS), self-reinforced plastic (SRP), polyamide-imide (PAI) and polyimide (PI), or a composite having the chemical compound as a matrix.

19. The apparatus according to claim 11, wherein the elastomer comprises a chemical compound having at least one of fluoro-elastomer (FKM), tetrafluoro-ethylene-propylene elastomer (FEPM), perfluoro-elastomer (FFKM), hydrogenated nitrile elastomer (HNBR), nitrile elastomer (NBR), copolymer of isobutylene and isoprene (IIR) and ethylene propylene-diene elastomer (EPDM), or a composite having the chemical compound as a matrix.

20. The apparatus according to claim 19, wherein the elastomer comprises a ternary fluoro-elastomer (FKM) and carbon nanofibers.

* * * * *